United States Patent
Wada et al.

(10) Patent No.: US 8,815,451 B2
(45) Date of Patent: Aug. 26, 2014

(54) NEGATIVE-ELECTRODE PLATE AND CYLINDRICAL CELL INCLUDING SAME

(75) Inventors: Satoshi Wada, Takasaki (JP); Isao Mugima, Takasaki (JP); Tomomi Nakamura, Takasaki (JP); Masaru Kihara, Takasaki (JP); Toshiki Sato, Takasaki (JP)

(73) Assignee: FDK Twicell Co., Ltd., Takasaki-shi (JP)

(*) Notice: Subject to any disclaimer, the term of this patent is extended or adjusted under 35 U.S.C. 154(b) by 114 days.

(21) Appl. No.: 13/535,166

(22) Filed: Jun. 27, 2012

(65) Prior Publication Data
US 2013/0004853 A1    Jan. 3, 2013

(30) Foreign Application Priority Data
Jun. 30, 2011    (JP) ................. 2011-146245

(51) Int. Cl.
| H01M 4/02 | (2006.01) |
| H01M 10/04 | (2006.01) |
| H01M 10/12 | (2006.01) |
| H01M 2/02 | (2006.01) |
| H01M 10/42 | (2006.01) |
| H01M 10/28 | (2006.01) |
| H01M 10/0587 | (2010.01) |

(52) U.S. Cl.
CPC ........ *H01M 10/0422* (2013.01); *H01M 10/125* (2013.01); *H01M 2004/021* (2013.01); *H01M 2/022* (2013.01); *H01M 2010/4292* (2013.01); *H01M 10/286* (2013.01); *Y02E 60/12* (2013.01); *H01M 10/123* (2013.01); *H01M 10/0587* (2013.01); *H01M 10/0431* (2013.01)
USPC ........................................ 429/233

(58) Field of Classification Search
None
See application file for complete search history.

(56) References Cited

U.S. PATENT DOCUMENTS
2005/0031939 A1    2/2005  Taguchi
2006/0035147 A1*   2/2006  Lam et al. ................. 429/218.1
(Continued)

FOREIGN PATENT DOCUMENTS
JP    04-206474       7/1992
JP    06-267583 A     9/1994
(Continued)

OTHER PUBLICATIONS
Extended European Search Report for EP 12 17 3885, dated Nov. 26, 2013.

Primary Examiner — Patrick Ryan
Assistant Examiner — Wyatt McConnell
(74) Attorney, Agent, or Firm — Marshall, Gerstein & Borun LLP (57) ABSTRACT

A negative-electrode plate 22 for use in a cylindrical cell, intended to be laid over a positive-electrode plate 21 with a separator 23 interposed between and rolled to form a cylindrical electrode body 20, with the positive-electrode plate 21 inside, the electrode body being arranged in a bottomed cylindrical outer can 10 to form the cylindrical cell, comprises a first negative-electrode part 22a which is to face the positive-electrode plate 21 on either side, with the separator 23 between, when formed into the electrode body 20, and a second negative-electrode part 22b which is to form the innermost circumference of the electrode body 20 and face the positive-electrode plate 21 only on one side, with the separator 23 between, when formed into the electrode body 20, the second negative-electrode part 22b being lower in negative-electrode active material density than the first negative-electrode part 22a.

6 Claims, 7 Drawing Sheets

(56) References Cited

U.S. PATENT DOCUMENTS

2006/0159998 A1 7/2006 Harada et al.
2009/0317721 A1* 12/2009 Shirane et al. ........... 429/231.95

FOREIGN PATENT DOCUMENTS

| JP | 2004-303484 A | 10/2004 |
|----|---------------|---------|
| JP | 2005-056677 A | 3/2005  |

* cited by examiner

NEGATIVE-ELECTRODE PLATE AND CYLINDRICAL CELL INCLUDING SAME

BACKGROUND OF THE INVENTION

1. Field of the Invention

This invention relates to a cylindrical cell comprising an electrode body arranged in a bottomed cylindrical outer can, the electrode body being formed by stacking a positive-electrode plate holding an positive-electrode active material and a negative-electrode plate holding a negative-electrode active material with a separator interposed to separate the positive-electrode plate and the negative-electrode plate and rolling them into a cylindrical shape with the negative-electrode plate outside, and a negative-electrode plate for use in such cylindrical cell.

2. Description of the Related Art

Cylindrical cells, such as cylindrical nickel-cadmium, nickel-hydrogen, or lithium-ion cells, comprise an electrode body arranged in a bottomed cylindrical outer can, the electrode body being formed by stacking a positive-electrode plate holding a positive-electrode active material and a negative-electrode plate holding a negative-electrode active material with a separator interposed to separate the positive-electrode plate and the negative-electrode plate and rolling them into a cylindrical shape with the negative-electrode plate outside. The negative-electrode plate for use in such cylindrical cells is produced by applying a negative-electrode active material on an electrically-conductive, porous, negative-electrode core body made from a perforated metal sheet, for example, and subjecting it to a working process such as extending by applying pressure.

There is publicly-known a prior-art cylindrical cell of this type which, in order to have an increased capacity, comprises a negative-electrode plate designed such that the parts forming the innermost and outermost circumferences of the electrode body are half as thick as the other part (see Japanese Patent Application Laid-open No. 06-267583). There is also publicly-known a cylindrical cell comprising a negative-electrode plate designed such that the two-side facing part, or part facing the positive-electrode plate on either side, with the separator between, is lower in active material density than the one-side facing parts, or parts facing the positive-electrode plate on only one side, with the separator between (see Japanese Patent Application Laid-open No. 2004-303484). There is also publicly-known a cylindrical cell comprising a positive-electrode plate with an increased thickness and a negative-electrode plate designed such that the part forming the outermost circumference of the electrode body has a reduced thickness (see Japanese Patent No. 4359099).

Generally, cylindrical cells of this type are produced by the following steps: First, an electrode body is formed by stacking a positive-electrode plate and a negative-electrode plate with a separator interposed between and rolling them into a cylindrical shape with the negative-electrode plate outside. Then, the electrode body is arranged in a bottomed cylindrical outer can, and then, a positive-electrode current-collector plate is mounted on the electrode body. Then, an electrolyte is put into the outer can through a hole in the center of the positive-electrode current-collector plate, then components including a positive-electrode lead are fitted, and last, the outer can is sealed with a lid body serving as a positive terminal of the cell.

As stated above, the electrolyte is put into the outer can through the hole in the center of the positive-electrode current-collector plate, which means that the electrolyte is put into a space in the center of the electrode body (space inside the innermost circumference of the electrode body). The electrolyte thus fills the outer can by gradually permeating the separator, positive-electrode plate and negative electrode plate, from the center to the periphery of the electrode body, where if the electrolyte does not satisfactorily permeate the electrode body, it follows that the whole electrode body fails to be uniformly activated, possibly resulting in deteriorated cycle performance and high-rate discharge performance. Thus, in manufacture of cylindrical cells, it is required to ensure that the electrolyte permeates the electrode body satisfactorily.

However, the electrode body including the negative-electrode plate designed such that the first turn forming the innermost circumference of the electrode body has an increased negative-electrode active material density, as in the cell disclosed in Japanese Patent Application Laid-open No. 2004-303494, for example, exhibits a greatly-decreased permeability to the electrolyte, resulting in increased time taken to put a required amount of the electrolyte into the outer can and let it permeate the electrode body, and thus, decreased efficiency of manufacture of the cylindrical cell.

SUMMARY OF THE INVENTION

The present invention has been made to solve the above-described problem. An object of the present invention is to present a cylindrical cell enabling an increased efficiency of manufacture.

In order to achieve the above object, the present invention provides a negative-electrode plate holding a negative-electrode active material for use in a cylindrical cell, intended to be laid over a positive-electrode plate holding a positive-electrode active material, with a separator interposed to separate the negative-electrode plate and the positive-electrode plate, and rolled to form a cylindrical electrode body with the positive-electrode plate inside, the cylindrical electrode body being arranged in a bottomed cylindrical outer can to form the cylindrical cell, comprising: a first negative-electrode part which is to face the positive-electrode plate on either side, with the separator between, when formed into the electrode body, and a second negative-electrode part which is to form the innermost circumference of the electrode body and face the positive-electrode plate on only one side, with the separator between, when formed into the electrode body, the second negative-electrode part being lower in the negative-electrode active material density than the first negative-electrode part.

The second negative-electrode part is that part of the negative-electrode plate which, when formed into the electrode body, faces the positive-electrode plate on only one side, with the separator between, and forms the innermost circumference of the electrode body. This second negative-electrode part of the negative-electrode plate is lower in the negative-electrode active material density than the first negative-electrode part, and thus, exhibits a higher permeability to the electrolyte (higher speed of electrolyte permeation). This allows the electrolyte, put into the space in the center of the electrode body (space inside the innermost circumference of the electrode body) in the process of manufacture of the cylindrical cell, to permeate the electrode body in an improved manner, and thus, reduces the time taken to put a required amount of the electrolyte into the outer can and let it permeate the electrode body satisfactorily, in the process of manufacture of the cylindrical cell.

Unless the total amount of the negative-electrode active material held on the negative-electrode plate is changed, the amount of the electrolyte that can be put into the outer can should stay the same. Reducing the negative-electrode active material density of the second negative-electrode part while keeping the total amount of the negative-electrode active material unchanged results in an apparently-increased volume of the negative-electrode active material on the second negative-electrode part, and thus, an apparently-reduced capacity of the outer can to hold the electrolyte. In fact, however, the amount of the electrolyte permeating the negative-electrode active material on the second negative-electrode part is increased correspondingly. Thus, reducing the negative-electrode active material density of the second negative-electrode part allows the outer can to have the same capacity to hold the electrolyte as before. The negative-electrode plate according to the present invention thus does not result in a decrease in the capacity of the cylindrical cell.

The present invention thus enables an increased efficiency of cylindrical-cell manufacture.

In the electrode body formed by rolling the positive-electrode plate and the negative-electrode plate stacked with the separator between, into a cylindrical shape, with the negative-electrode plate outside, the first turn of the negative-electrode plate forming the innermost circumference of the electrode body has the smallest diameter, and thus, undergoes the largest load. In the manufacture of the cylindrical cell, the first turn of the negative-electrode plate is therefore most likely to experience trouble, such as separation or fracture of the negative-electrode active material, during forming of the electrode body. According to the present invention, however, the second negative-electrode part of the negative-electrode plate which forms the first turn of the electrode body has a reduced negative-electrode active material density, and thus, an increased flexibility, which leads to a reduced possibility that the first turn of the negative-electrode plate experiences trouble, such as separation or fracture of the negative-electrode active material, during forming of the electrode body in the manufacture of the cylindrical cell.

In the negative-electrode plate according to the present invention, the negative-electrode active material density of the second negative-electrode part is desirably greater than 0% and less than or equal to 75% of that of the first negative-electrode part.

This ensures that the second negative-electrode part of the negative-electrode plate (part forming the innermost circumference of the electrode body) has a sufficiently-increased permeability to the electrolyte, and thus, that the time taken to put a required amount of the electrolyte into the outer can and let it permeate the electrode body satisfactorily is sufficiently reduced in the manufacture of the cylindrical cell.

In the negative-electrode plate according to the present invention, the second negative-electrode part may be smaller in thickness than the first negative-electrode part.

This leads to an increased volumetric efficiency of the electrode body, and thus, an increased capacity of the cylindrical cell.

The present invention also provides a cylindrical cell comprising an electrode body arranged in an bottomed cylindrical outer can, the electrode body being formed by stacking a positive-electrode plate holding a positive-electrode active material and a negative-electrode plate holding a negative-electrode active material with a separator interposed to separate the positive-electrode plate and the negative-electrode plate and rolling them into a cylindrical shape with the negative-electrode plate outside, characterized in that the negative-electrode plate comprises a first native-electrode part which, when formed into the electrode body, faces the positive-electrode plate on either side, with the separator between, and a second negative-electrode part which, when formed into the electrode body, forms the innermost circumference of the electrode body and faces the positive-electrode plate on only one side, with the separator between, the second negative-electrode part being lower in the negative-electrode active material density than the first negative-electrode part.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

With reference to the drawings attached, an embodiment of the present invention will be described below.

Structure of Nickel-Hydrogen Secondary Cell

Figure 1:
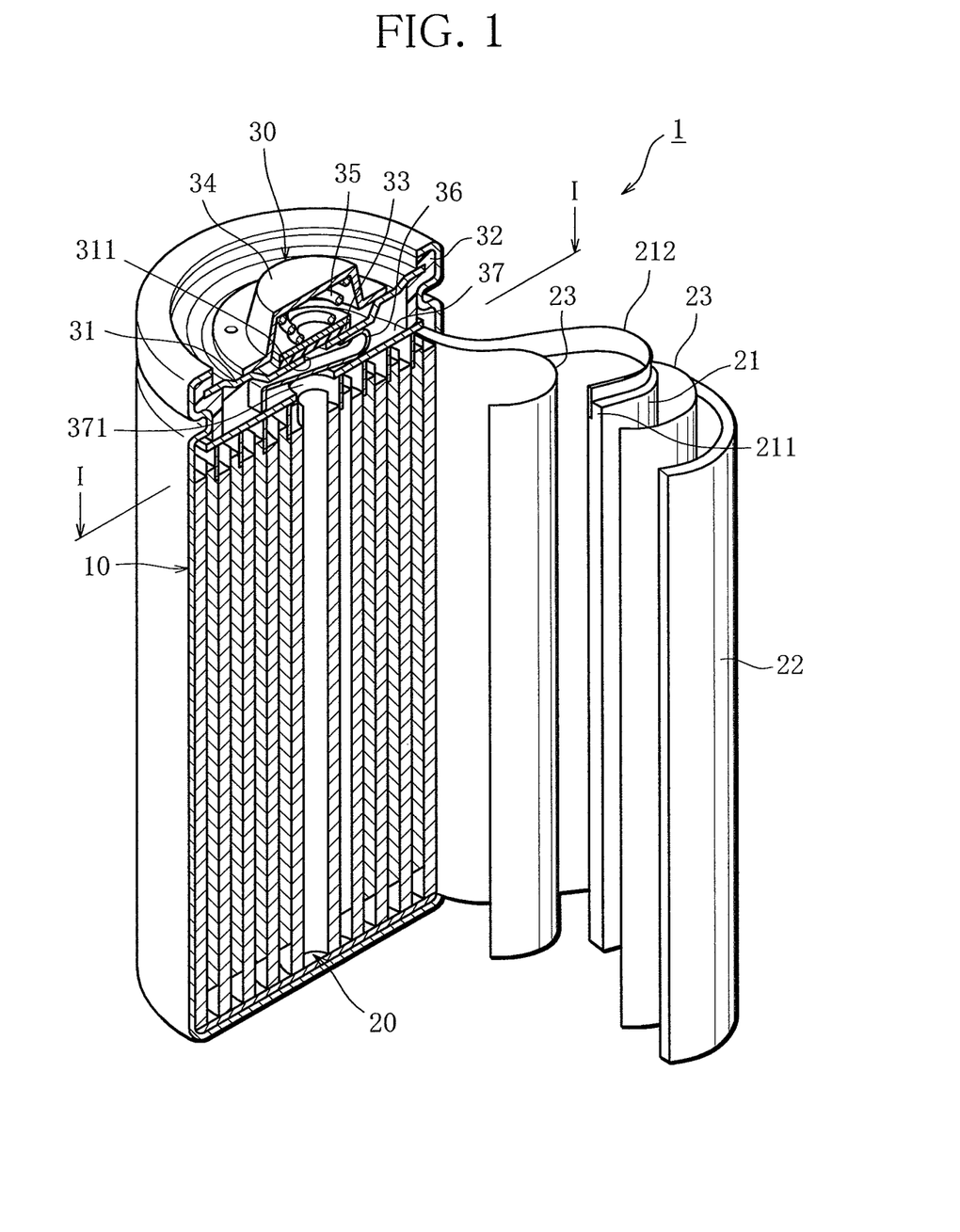
FIG. 1 is a perspective view showing a vertical cross-section of a nickel-hydrogen secondary cell.
Figure 2:
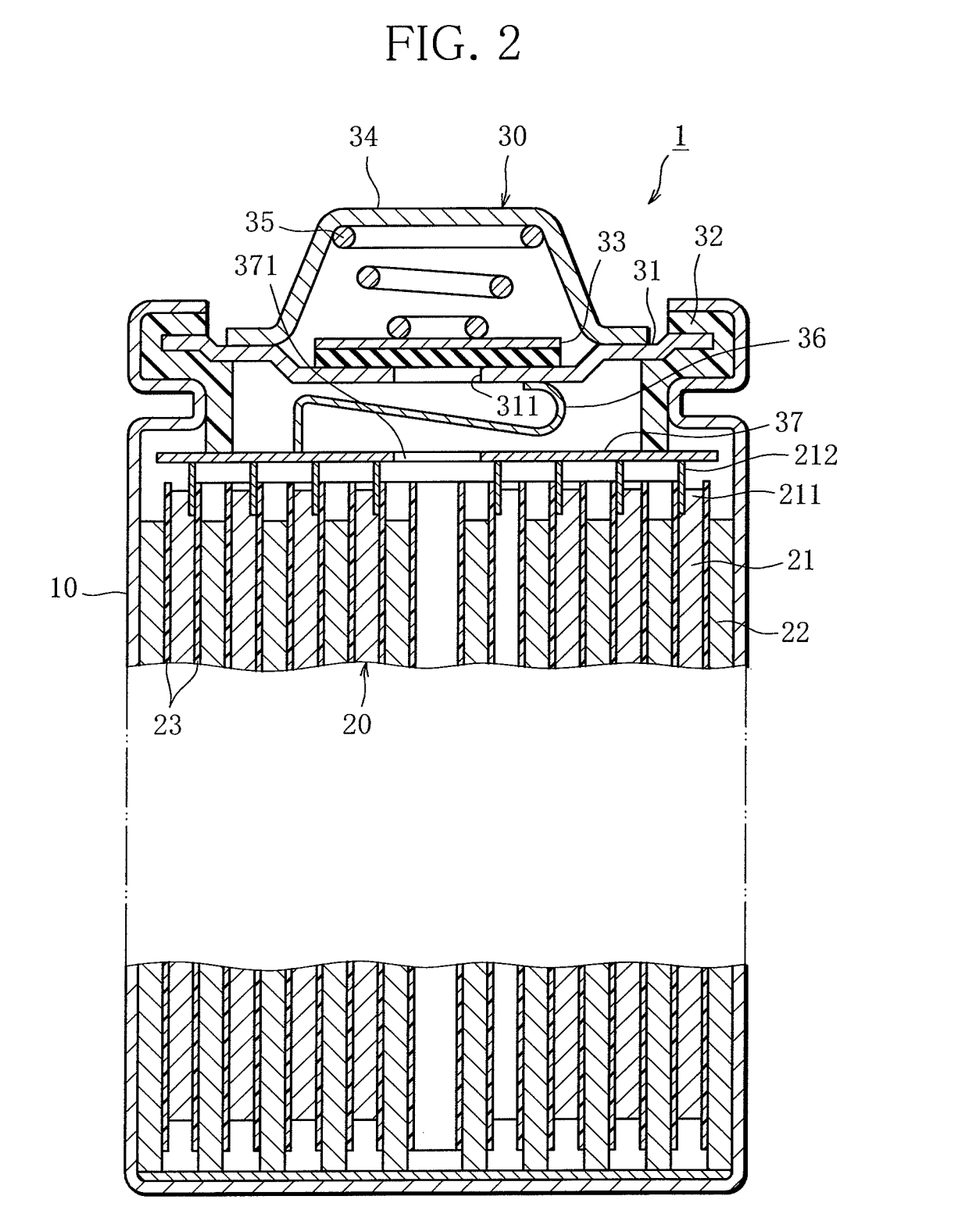
FIG. 2 is a cross-sectional view of the nickel-hydrogen secondary cell showing how a positive-electrode plate and a positive-electrode current-collector plate are connected together and how a negative-electrode plate and a negative-electrode current-collector plate are connected together.
Figure 3:
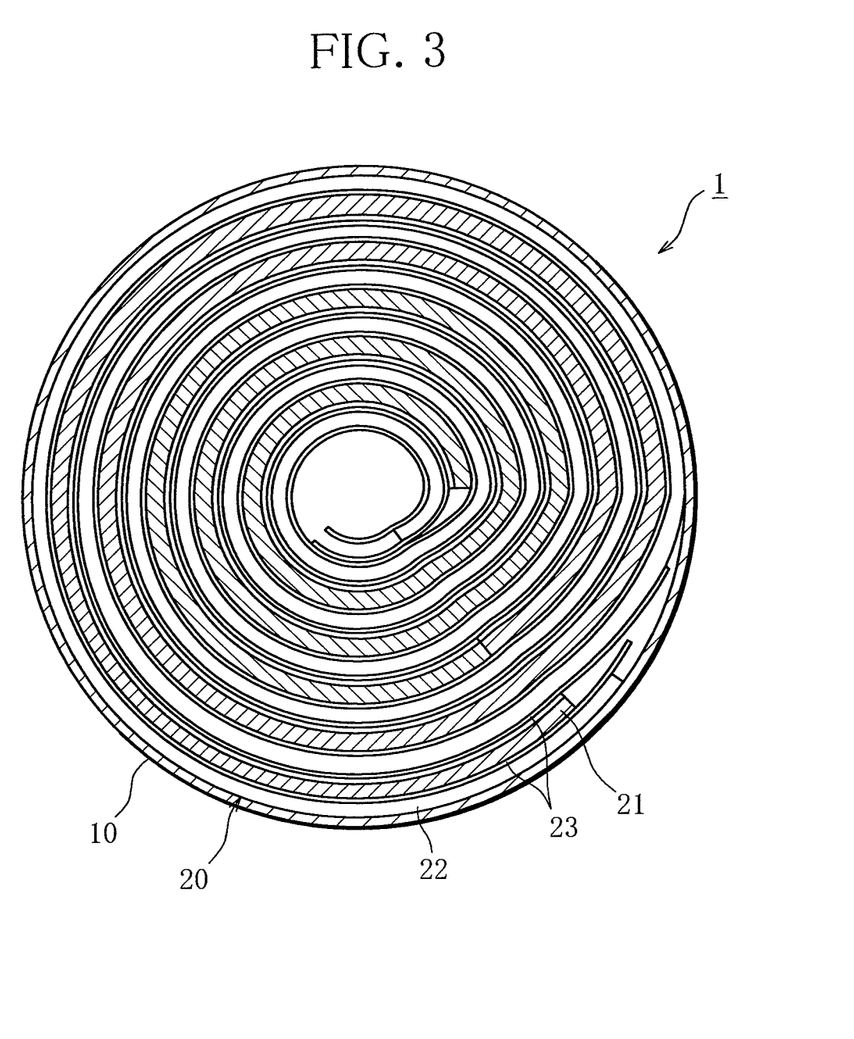
FIG. 3 is a transverse cross-sectional view of the nickel-hydrogen secondary cell along line I-I indicated in FIG. 1.

Referring to FIGS. 1 to 3, structure of a nickel-hydrogen secondary cell 1 will be described.

FIG. 1 is a perspective view showing a vertical cross-section of the nickel-hydrogen secondary cell 1, FIG. 2 a plan view showing a transverse cross-section of the nickel-hydrogen secondary cell 1, and FIG. 3 a transverse cross-sectional view of the nickel-hydrogen secondary cell 1 along line I-I indicated in FIG. 1.

The cylindrical nickel-hydrogen secondary cell 1 exemplifying the "cylindrical cell" comprises an outer can 10, an electrode body 20 and a lid structure 30. The outer can 10 is an electrically-conductive bottomed cylindrical member open at the top. The electrode body 20 is formed by stacking a positive-electrode plate 21 and a negative-electrode plate 22 with a separator 23 interposed between and rolling them into an approximately cylindrical shape with the negative-electrode plate 22 outside. The lid structure 30 is designed to close the open top of the outer can 10. The nickel-hydrogen secondary cell 1 is constructed by arranging the electrode body 20 in the outer can 10, then putting an alkaline electrolyte (not shown) into it, and then closing the open top of the outer can 10 with the lid structure 30.

The positive-electrode plate 21 is a non-sintered nickel electrode comprising a positive-electrode core body (not shown) and a positive-electrode mixture held thereon. The positive-electrode core body is made of an alkaline-resistant metallic material. The alkaline-resistant metallic material usable is nickel, for example. The positive-electrode mixture contains particles of a positive-electrode active material, particles of a variety of additives for improving the performance of the positive-electrode plate, and a binder for binding the mixture of the positive-electrode active material particles and the additive particles to the positive-electrode core body.

The positive-electrode active material particles are nickel hydride particles. The nickel hydride particles may be particles of high-order nickel hydride, or nickel hydride with the average valence of nickel being greater than 2. The nickel hydride particles may be particles of a solid solution formed with cobalt, zinc, cadmium or other element incorporated in nickel hydride, or alternatively, particles of nickel hydride covered with a cobalt compound. The additives usable include yttrium oxide, elemental cobalt, cobalt compounds such as cobalt oxide and cobalt hydroxide, elemental zinc, zinc compounds such as zinc oxide and zinc hydroxide, and rare earth compounds such as erbium oxide. The binders usable include hydrophilic and hydrophobic polymers. More specifically, the binders usable include hydroxypropylcellulose (HPC), carboxymethylcellulose (CMC) and sodium polyacrylate (SPA), which may be used alone or in combination. The binder is used in the proportion of 0.1 to 0.5 mass parts relative to 100 mass parts of positive-electrode active material particles, for example.

A negative-electrode plate 22 is an electrically-conductive strip-shaped core body (not shown) with a negative-electrode mixture held thereon. The negative-electrode core body is a sheet-like piece of metallic material having through-holes. It may be a perforated metal sheet, a sintered meal substrate, an expanded metal sheet or a nickel net, for example. A perforated metal sheet and a sintered metal substrate, or substrate created by sintering metallic powder in a mold are particularly suitable to be used as the negative-electrode core body.

The negative-electrode mixture serving as a "negative-electrode active material" contains particles of a hydrogen storage alloy capable of storing and releasing hydrogen and a binder. Particles of those hydrogen storage alloys which can store hydrogen, electrochemically produced in the electrolyte during charging of the cell, and easily release it during discharge are usable. The hydrogen storage alloy used does not need to be a specific type. AB5 type hydrogen storage alloys, such as LaNi5 and MmNi5 (Mm represents mischmetal), are usable, for example. The negative-electrode mixture may contain a cadmium compound, in place of the hydrogen storage alloy, for example. Binders usable include hydrophilic and hydrophobic polymers.

Materials usable for the separator 23 include nonwoven fabrics made from fibers of polyamide or polyolefine such as polyethylene and polypropylene, each with hydrophilic functional groups added.

The lid structure 30 includes a lid plate 31, an insulating gasket 32, a valve element 33, a positive-electrode terminal 34, a compression coil spring 35, a positive-electrode lead 36 and a positive-electrode current-collector plate 37. The lid plate 31 is approximately circular in shape and has a valve hole 31 in the center. The lid plate 31 is fixed to the outer can 10 by swaging the rim of the outer can 10 to hold the insulating gasket 32 inside. The valve element 33, formed by bonding a rubber plate and a metal plate together, is mounted on the outer surface of the lid plate 31 to close the valve hole 311. The positive-electrode terminal 34 is in the shape of a flanged cylinder and fixed to cover the valve element 33. The compression coil spring 35 is arranged within the positive-electrode terminal 34 to press on the valve element 33. The positive-electrode lead 36 is bent with an end welded to the inner surface of the lid plate 31 and the other end welded to the positive-electrode current collector plate 37. The positive-electrode current collector plate 37 is circular in shape and has a hole 371 in the center through which to put the alkaline electrolyte into the outer can 10.

The end of the positive-electrode core body of the positive-electrode plate 21 nearer to the positive-electrode current collector plate 37 is intended as a connecting portion 211. A metallic strip, or thin plate 212, such as a nickel ribbon, is fixed to the radially-inner surface of the connecting portion 211 by welding or bonding with an electrically-conductive bonding agent, for example. The metallic thin plate 212 projects from the connecting portion 211 to contact the positive-electrode current collector plate 37. The positive-electrode current collector plate 37 and the positive-electrode plate 21 are thus electrically connected together by the metallic thin plate 212. The negative electrode plate 22, on the other hand, is arranged in contact with the inner circumferential surface of the outer can 10 serving as a negative-electrode terminal of the nickel-hydrogen secondary cell 1, and thus, electrically connected to the outer can 10.

Structure of Negative-Electrode Plate

Figure 4:
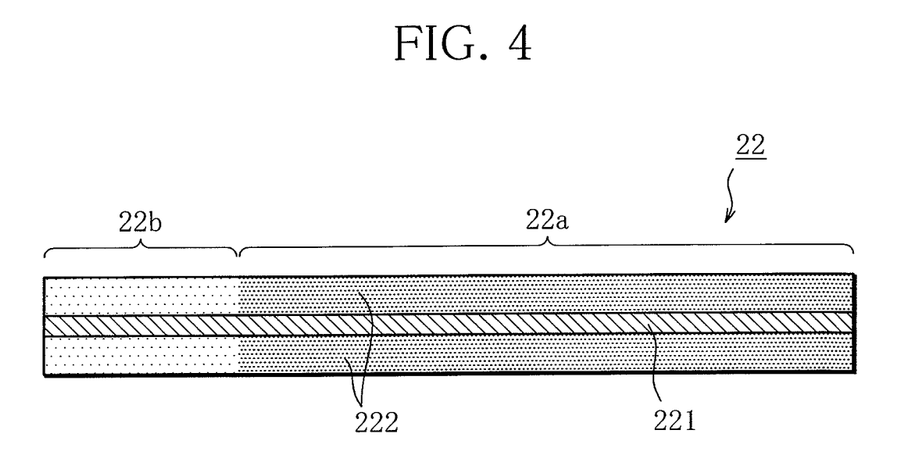
FIG. 4 shows a cross-section of the negative-electrode plate viewed from the front.

Referring to FIG. 4, the structure of the negative-electrode plate 22 according to the present invention will be described.

FIG. 4 shows a cross-section of the negative-electrode plate 22 according to the present invention, viewed from the front.

The negative-electrode plate 22 comprises a negative-electrode core body 221 with a negative-electrode active material 222 held on either side. The negative-electrode core plate 22 includes a first negative-electrode part 22a and a second negative-electrode part 22b. The first negative-electrode part 22a is a part which is to face the positive-electrode plate 21 on either side, with the separator 23 interposed between, when formed into the electrode body 20. The second negative-electrode part 22b is a part which is to form the innermost circumference of the electrode body 20, and thus, face the positive-electrode plate 21 on only one side, with the separator 23 interposed between, when formed into the electrode body 20.

The second negative-electrode part 22b is lower in negative-electrode active material 222 density (referred to as "negative-electrode active material density") than the first negative-electrode part 22a.

The second negative-electrode part 22b does not need to have a uniform negative-electrode active material density all over. Although the second negative-electrode part 22b needs to have a mean negative-electrode active material density lower than that of the first negative-electrode part 22a, it is allowed to have a non-uniform negative-electrode active material density.

The negative-electrode plate 22 thus designed exhibits a higher permeability to the alkaline electrolyte (thus, higher alkaline-electrolyte seepage speed) in the second negative-electrode part 22b than in the first negative-electrode part 22b. Since the second negative-electrode part 22b of the negative-electrode plate 22 forms the innermost circumference of the electrode body 20, this allows the alkaline electrolyte put into the space in the center of the electrode body 20 (space inside the innermost circumference of the electrode body 20) to permeate the electrode body 20 in an improved manner, which means that, in the manufacture of the nickel hydrogen secondary cell 1, time taken to put a required amount of the alkaline electrolyte into the outer can 10 and let it sufficiently permeate the electrode body 20 is reduced.

Provided that the total amount of the negative-electrode active material 222 held on the negative-electrode plate 22 remains unchanged, the amount of the alkaline electrolyte that can be put into the outer can 10 should remain unchanged. Reducing the negative-electrode active material density of the second negative-electrode part 22b while keeping the total amount of the negative-electrode active material unchanged results in an apparently-increased volume of the negative-electrode active material 222 on the second negative-electrode part 22b, and thus, an apparently-reduced capacity of the outer can 10 to hold the alkaline electrolyte. In fact, however, the amount of the alkaline electrolyte permeating the negative-electrode active material 222 on the second negative-electrode part 22b is increased correspondingly. Thus, reducing the negative-electrode active material density of the second negative-electrode part 22b allows the outer can to have the same capacity to hold the alkaline electrolyte as otherwise. In other words, the negative-electrode plate 22 according to the present invention does not result in a reduction in capacity of the nickel-hydrogen secondary cell 1.

The present invention can thus improve the efficiency of manufacturing cylindrical cells, such as cylindrical nickel-hydrogen secondary cells.

In the electrode body 20 formed by rolling the positive-electrode plate 21 and the negative-electrode plate 22 stacked with the separator 23 between, with the negative-electrode plate 22 outside, the first turn of the negative electrode 22 forming the innermost circumference of the electrode body 20 has the smallest diameter and thus undergoes the largest load. Thus, in the manufacture of the nickel-hydrogen secondary cell 1, the first turn of the negative electrode 22 is most likely to experience trouble, such as separation or fracture of the negative-electrode active material 222, during the forming of the electrode body 20. The negative-electrode plate 22 according to the present invention has, however, a second negative-electrode part 22b having a reduced negative-electrode active material density, which means that the second negative-electrode part 22b forming the first turn of the electrode body 20 has an increased flexibility, leading to a reduced possibility that the first turn of the negative electrode 22 experiences trouble, such as separation or fracture of the negative-electrode active material 222, during the forming of the electrode body 20 in the manufacture of the nickel-hydrogen secondary cell 1.

In the negative-electrode plate 22 according to the present invention, the negative-electrode active material density of the second negative-electrode part 22b is desirably greater than 0% and less than or equal to 75% of that of the first negative-electrode part 22a. This ensures that the second negative-electrode part 22b of the electrode plate 22 has a sufficiently-improved permeability to the alkaline electrolyte. In the present embodiment of negative-electrode plate 22, the negative-electrode active material density of the first negative-electrode part 22b is 5.20 g/cm3 while that of the second negative-electrode part 22b is 3.90 g/cm3, for example.

Method of Producing the Negative-Electrode Plate

Figure 5:
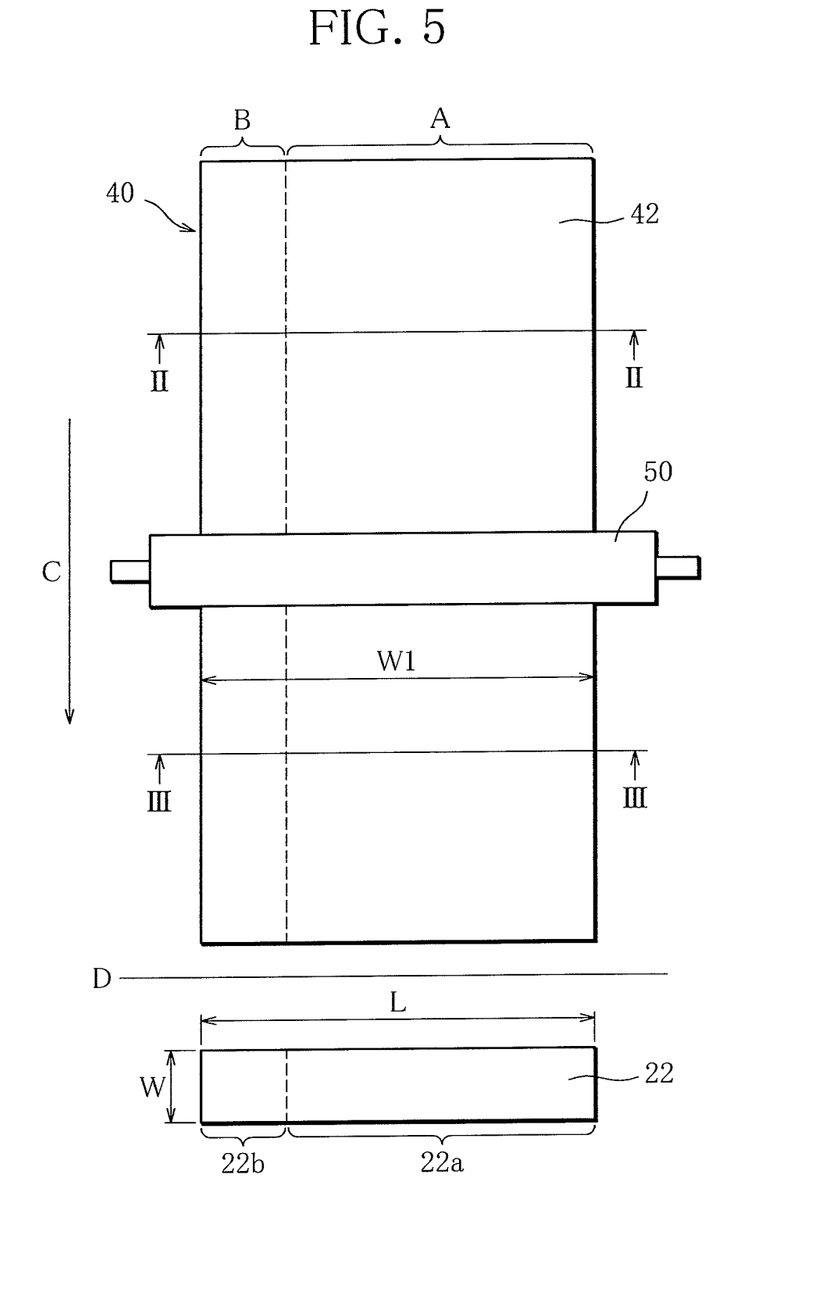
FIG. 5 is a plan view schematically illustrating how the negative-electrode plate is manufactured.
Figure 6A:
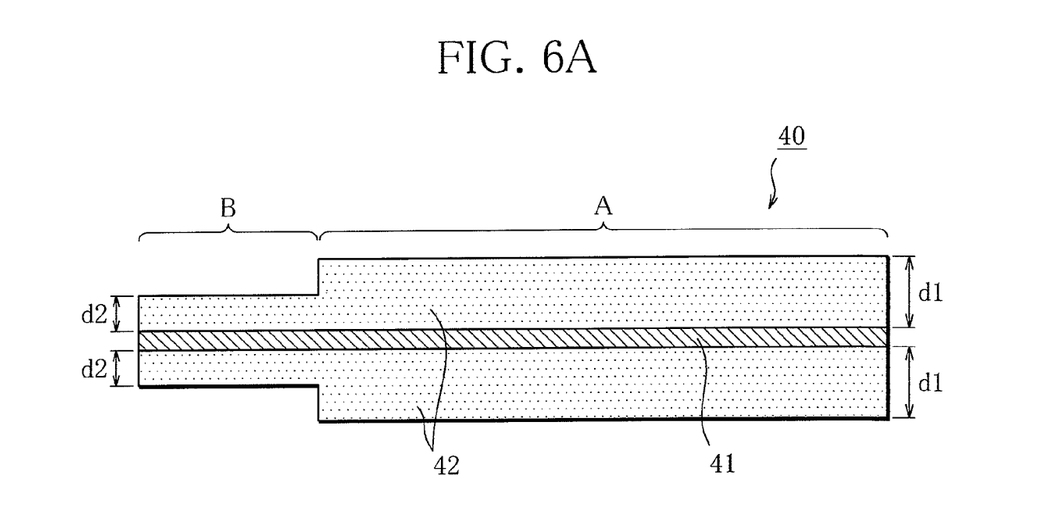
FIG. 6A shows cross-sections of a continuous sheet from which to obtain the negative-electrode plate, along lines II-II indicated in FIG. 5, respectively.
Figure 6B:
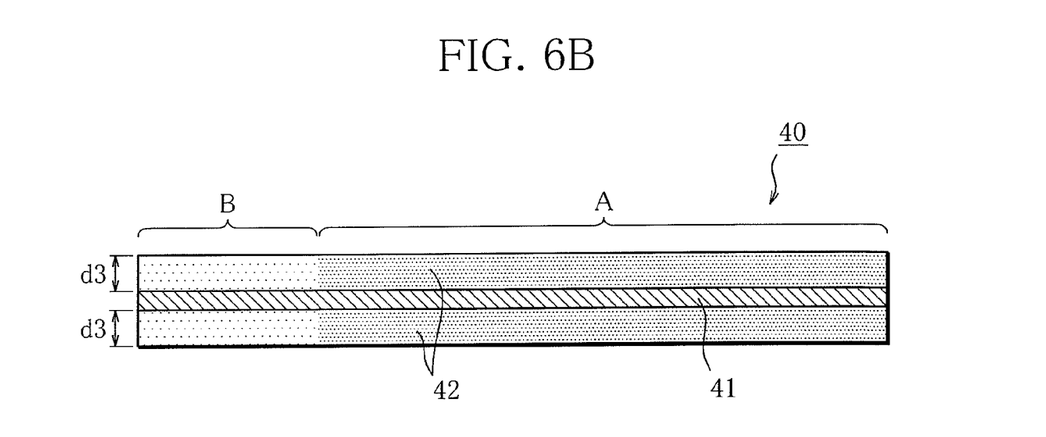
FIG. 6B shows cross-sections of a continuous sheet from which to obtain the negative-electrode plate, along lines III-III indicated in FIG. 5, respectively.

Referring to FIGS. 5 and 6, an example of method of producing the negative-electrode plate 22 according to the present invention will be described.

FIG. 5 is a plan view schematically illustrating the process of producing the negative-electrode plate 20, and FIG. 6 shows cross-sections of a continuous sheet 40 from which to obtain the negative-electrode plate 22, where FIG. 6A shows a cross-section of the continuous sheet 40 along line II-II indicated in FIG. 5, and FIG. 6B a cross-section thereof along line III-III in FIG. 5.

First, a continuous sheet 40 from which to obtain the negative-electrode plate is formed by applying a slurry-form negative-electrode active material 42 containing a hydrogen storage alloy on either side of a continuous sheet 41 from which to form the negative-electrode core body, such as a perforated metal sheet. The continuous sheet 40 from which to obtain the negative-electrode plate 22 has a width W1 approximately equal the length L of the negative-electrode plate 22. The negative-electrode active material 42 is applied on the continuous sheet 41 to form a thickness d1 in a region A defined to form the first negative-electrode part 22a of the negative electrode plate 22 (referred to as "first negative-electrode region A") and a thickness d2 in a region B defined to form the second negative-electrode part 22b of the negative electrode plate 22 (referred to as "second negative-electrode region B"), the thickness d1 being greater than the thickness d2 (FIG. 6A).

Then, the continuous sheet 40 being fed in the feeding direction C is extended by applying pressure with rolls 50 having a length greater than the width W of the continuous sheet 40. Specifically, the continuous sheet 40 is extended by applying pressure with the rolls 50 in the manner that the first and second negative-electrode regions A and B are simultaneously extended by applying pressure to have a predetermined thickness d3 of the negative-electrode active material 42 (FIG. 6B). As a result, the first negative-electrode region A with a greater thickness of the negative-electrode active material 42 applied has a higher negative-electrode active material density, and the second negative-electrode region B with a smaller thickness of the negative-electrode active material 42 applied has a lower negative-electrode active material density.

After extending by applying pressure, the continuous sheet 40 is cut at predetermined cutting positions D with a cutting device. More specifically, the continuous sheet 40 is cut to a length, or size in the feeding direction C equal to the width W of the negative-electrode plate 22. Continuously-performed cutting of the continuous sheet 40 produces a plurality of negative-electrode plates 22 with length L, width W and thickness d3 and with the negative-electrode active material density being lower in the second negative-electrode part 22a than in the first negative-electrode part 22b.

The negative-electrode active material density of the first negative-electrode part 22a of the negative electrode plate 22 can be regulated by altering the ratio between the before-extending thickness d1 of the first negative-electrode region A of the continuous sheet 40 and the after-extending thickness d3 thereof. Likewise, the negative-electrode active material density of the second negative-electrode part 22b of the negative electrode plate 22 can be regulated by altering the ratio between the before-extending thickness d2 of the second negative-electrode region B of the continuous sheet 40 and the after-extending thickness d3 thereof.

Other Embodiments, Variants

Although the above-described embodiment of negative electrode plate 22 has a first and a second negative-electrode parts 22a, 22b having the same thickness d3, the present invention is not restricted to this embodiment. The negative-electrode plate 22 according the present invention may have a first and a second negative-electrode parts 22a, 22b different in thickness, provided that the second negative-electrode part 22b is lower in negative-electrode active material density than the first negative-electrode part 22a. Further, neither the first negative-electrode part 22a nor the second negative-electrode part 22b needs to have a uniform thickness; each may include portions different in thickness.

Figure 7:
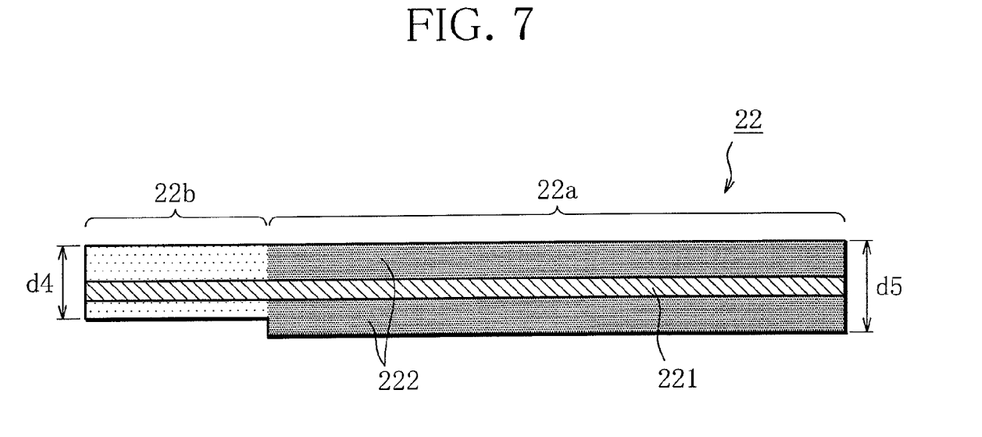
FIG. 7 shows a cross-section of a variant of negative-electrode plate according to the present invention, viewed from the front.

FIG. 7 shows a cross-section of a variant of negative-electrode plate 22 according to the present invention, viewed from the front.

This variant of negative electrode plate 22 has a second negative-electrode part 22b which is lower in negative-electrode active material density than the first negative-electrode part 22a and which has a thickness d4 smaller than the thickness d5 of the first negative-electrode part 22a. The second negative-electrode part 22b with a reduced thickness d4 enables an increased volumetric efficiency of the electrode body 20 in the outer can 10, and thus, helps achieve a high-capacity nickel-hydrogen secondary cell 1.

What is claimed is:

1. A negative-electrode plate holding a negative-electrode active material for use in a cylindrical cell intended to be laid over a positive-electrode plate holding a positive-electrode active material with a separator interposed to separate the negative-electrode plate and the positive-electrode plate and rolled to form a cylindrical electrode body with the positive-electrode plate inside, the cylindrical electrode body being arranged in a bottomed cylindrical outer can to form the cylindrical cell, comprising:
   a negative-electrode core body with a negative-electrode active material held on both sides;
   a first negative-electrode part which is to face the positive-electrode plate on both sides, with the separator between, when formed into the electrode body, and
   a second negative-electrode part which is to form the innermost circumference of the electrode body and face the positive-electrode plate on only one side, with the separator between, when formed into the electrode body, the second negative-electrode part being lower in the negative-electrode active material density than the first negative-electrode part, and wherein the negative-electrode active material completely covers both sides of the negative-electrode core body of the second negative-electrode part.

2. The negative-electrode plate according to claim 1, wherein
   the second negative-electrode part has a negative-electrode active material density greater than 0% and less than or equal to 75% of the negative-electrode active material density of the first negative-electrode part.

3. The negative-electrode plate according to claim 1, wherein
   the second negative-electrode part is smaller in thickness than the first negative-electrode part.

4. The negative-electrode plate according to claim 2, wherein
   the second negative-electrode part is smaller in thickness than the first negative-electrode part.

5. A cylindrical cell comprising an electrode body arranged in a bottomed cylindrical outer can, the electrode body being formed by stacking a positive-electrode plate holding a positive-electrode active material and a negative-electrode plate holding a negative-electrode active material with a separator interposed to separate the positive-electrode plate and the negative-electrode plate and rolling them into a cylindrical shape with the negative-electrode plate outside, the negative-electrode plate being formed by a continuous metal sheet having negative-electrode material applied to both sides, wherein
   the negative-electrode plate comprises
   a first negative-electrode part which, when formed into the electrode body, faces the positive-electrode plate on either side, with the separator between, and
   a second negative-electrode part which, when formed into the electrode body, forms the innermost circumference of the electrode body and faces the positive-electrode plate on only one side, with the separator between, the second negative-electrode part being lower in the negative-electrode active material density than the first negative-electrode part;
   wherein the continuous metal sheet has the negative-electrode material applied to form a thickness d1 in a region A defined to form the first negative-electrode part and a thickness d2 in a region B defined to form the second negative-electrode part, the thickness d1 being greater than the thickness d2 such that, upon applying pressure, regions A and B are extended, resulting in the second negative-electrode part having a lower active material density than the first negative-electrode part.

6. The negative-electrode plate according to claim 1, wherein the negative-electrode plate is formed by a continuous metal sheet having negative-electrode material applied to both sides, the continuous metal sheet having the negative-electrode material applied to form a thickness d1 in a region A defined to form the first negative electrode part and a thickness d2 in a region B defined to form the second negative-electrode part, the thickness d1 being greater than the thickness d2 such that, upon applying pressure, regions A and B are extended, resulting in the second negative-electrode part having a lower active material density than the first negative-electrode part.

* * * * *